March 22, 1966   N. BLOEMBERGEN   3,242,422
PARAMAGNETIC RESONANCE PRECESSION METHOD
AND APPARATUS FOR WELL LOGGING
Filed Dec. 24, 1954   2 Sheets-Sheet 1

*INVENTOR.*
NICOLAAS BLOEMBERGEN
BY
HIS ATTORNEY.

United States Patent Office 3,242,422
Patented Mar. 22, 1966

3,242,422
PARAMAGNETIC RESONANCE PRECESSION
METHOD AND APPARATUS FOR WELL
LOGGING
Nicolaas Bloembergen, Cambridge, Mass., assignor, by mesne assignments, to Schlumberger Well Surveying Corporation, Houston, Tex., a corporation of Texas
Filed Dec. 24, 1954, Ser. No. 477,566
7 Claims. (Cl. 324—.5)

The present invention relates to methods and apparatus for well logging and more particularly to new and improved methods and apparatus for distinguishing between porous and non-porous earth formations traversed by a borehole, and between different fluids situated in such porous formations.

The fluids contained in porous formations will, in general, exhibit molecular self-diffusion, and different formation fluids, for example water and oil, may have different rates of molecular self-diffusion dependent generally on the viscosity of the fluid in question. On the other hand, non-porous formations which contain no fluid can exhibit no molecular self-diffusion.

Accordingly, it is a primary object of the present invention to provide novel methods and apparatus for distinguishing between porous and non-porous earth formations traversed by a borehole by detecting the molecular self-diffusion associated with fluids contained in porous formations.

Another object of the present invention is to provide novel methods and apparatus for locating fluid-bearing formations traversed by a borehole by detecting the molecular self-diffusion in such formations.

A further object of the invention is to provide novel methods and apparatus for distinguishing between different fluids of different viscosities present in the earth formations traversed by a borehole by determining the relative rates of self-diffusion of any fluid present.

Still another object of the invention is to provide novel methods and apparatus for locating formation fluids having a predetermined rate of molecular self-diffusion.

These and other objects of the invention are attained by employing magnetic resonance techniques to determine the constant of self-diffusion of any fluid present in formations traversed by a borehole, whereby porous and non-porous formations may be distinguished, and fluids having different rates of self-diffusion may be identified. In accordance with the invention, a substantially constant, slightly non-homogeneous magnetic field is applied to a particular region in an earth formation traversed by a borehole, and precession of the magnetic moments associated with a particular class of particles, for example protons, is induced. However, due to the inhomogeneity of the magnetic field, the resonant precession frequency of the particles will differ depending on the different field strengths in which particular particles may be located. When molecular self-diffusion is present, the particles will be continuously transported into regions of different field strengths, thus causing a continuous change in the resonance precession frequency of each particle. Such continuous frequency variations have the effect of destroying the phase coherence of the precessing magnetic moments in the plane perpendicular to the magnetic field, the rate at which the phase coherence is destroyed being a function of the rate of self-diffusion. Since magnetic resonance measurements are made in this plane, the reduction of phase coherence causes a corresponding decay in the measurable resonance signal, which decay is, therefore, dependent on the rate of self-diffusion. In accordance with the present invention this resulting decay is detected in order to determine the constant of self-diffusion of the fluid in the formation at a given level in the borehole.

In a representative embodiment, magnetic field generating means is passed through a borehole for applying a substantially constant, slightly non-homogeneous magnetic field to a particular formation region opposite the generating means. A spin-echo method is employed to obtain at least two echo pulses resulting from free precession of protons (hydrogen) in the region, after different decay intervals. By comparing the amplitudes of the pulses the rate of decay of the precession may be determined, thereby giving an indication of the constant of self-diffusion of any fluid present in the formation. If desired, the decay interval may be selected so as to emphasize a particular constant of self-diffusion whereby formations containing fluid having a particular constant self-diffusion may be readily located.

The invention will be better understood with reference to the accompanying drawings, in which.

Figure 1:
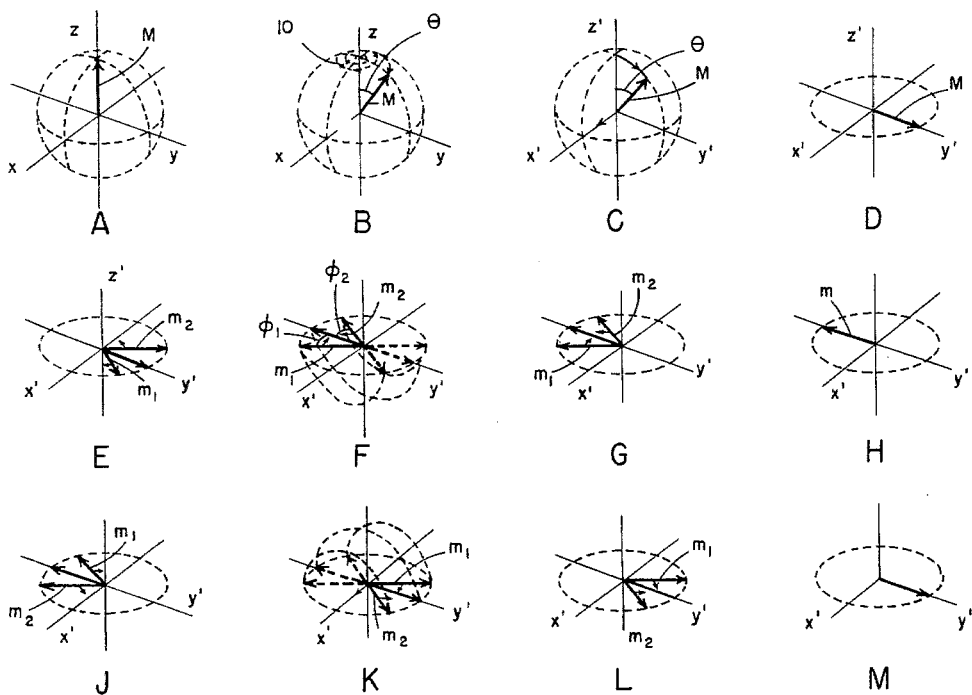
FIG. 1 is a series of vector diagrams employed to explain the principles of the invention.

In order to acquaint the reader with the spin-echo technique of magnetic resonance observations, reference may be had to FIG. 1. In FIG. 1A, the total macroscopic moment M of the particular paramagnetic particles under investigation is lined up along the $z$ axis with the substantially constant, slightly inhomogeneous magnetic field of average intensity $H_0$, after thermal equilibrium has been reached. The total macroscopic moment M is the sum of the macroscopic moments of individual volume elements of the sample under investigation. If now an R.F. field of effective intensity $H_1$ is generated by a coil having its axis along the $x$ axis and activated with a radio-frequency current at the resonance precession frequency $f_0$, the total macroscopic moment M will precess about the $z$ axis in a spiral 10 at the resonance frequency $f_0$ and nutate through an angle $\theta$, as shown in FIG. 1B, where $$f_0 = \gamma H_0 / 2\pi \tag{1}$$

and $\gamma$ is a constant (the gyromagnetic ratio) for the particular particles under investigation, and where:

$$\theta = \gamma H_1 t \tag{2}$$

and $t$ is the time during which the R.F. signal has been applied. As is well-known, the actual applied intensity of the R.F. field must be $2H_1$, since the effective intensity is only one-half this value. Hereinafter wherever the intensity of the R.F. field is referred to, it will be understood that this is the effective intensity.

Figure 2:
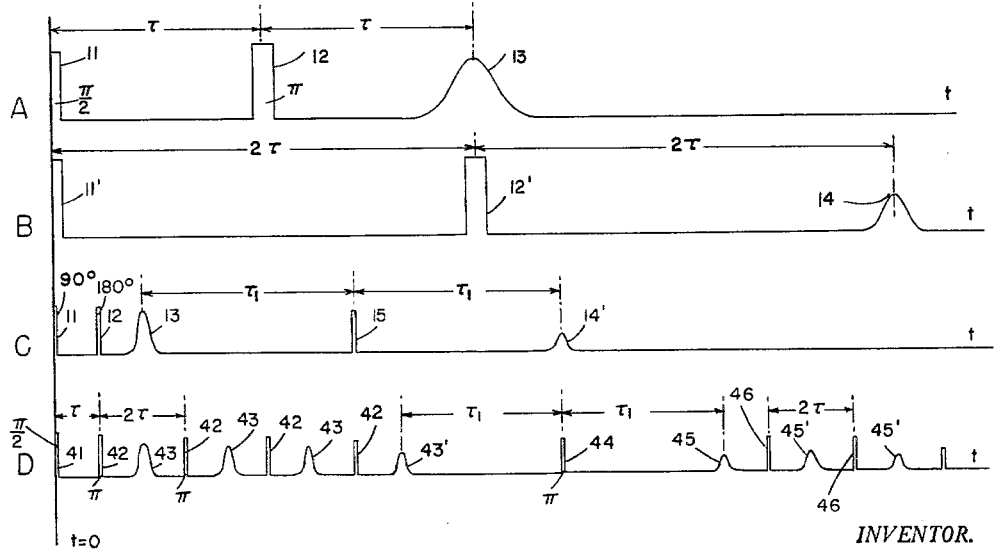
FIG. 2 is a series of impulse diagrams also employed to explain the principles of the invention.

It is more convenient to view the nutation shown in FIG. 1B in a frame of reference rotating about the $z$ axis clockwise at the frequency $f_0$, where, as shown in FIG. 1C, the nutation of moment M thus appears as a pure rotation through the angle $\theta$. Hereafter the explanation will be considered from the rotating frame of reference. After a given time interval as determined from relation (2), the total macroscopic moment M will have nutated 90° ($\theta = \pi/2$) into the rotating equatorial plane $x'$, $y'$, as shown in FIG. 1D. The R.F. signal is now removed. The envelope 11 of this initial R.F. pulse is shown in FIG. 2A, and is designated hereinafter as a "90° pulse," i.e., an R.F. pulse of duration and amplitude sufficient in accordance with relation (2) above to produce a 90° nutation ($\theta = \pi/2$). However, since the constant field is not perfectly homogeneous, the individual macroscopic moments comprising the total macroscopic moment M from volume elements in field strengths different from $H_0$ will not precess at the frequency $f_0$. For example, the macroscopic moment $m_1$ associated with a volume element in a field greater than $H_0$ will precess at a frequency greater than $f_0$, while moment $m_2$ in a field less than $H_0$ will precess at a frequency less than $f_0$. In the rotating reference frame this will give the appearance of a fanning out of the individual macroscopic moments away from the $y'$ axis and after a time $\tau$ moments $m_1$ and $m_2$ will be in the positions shown in FIG. 1E, moment $m_1$ making an angle $\phi_1$ and moment $m_2$ an angle $-\phi_2$ with respect to the rotating $y'$ axis.

If now a 180° pulse 12, i.e., an R.F. pulse of duration and amplitude sufficient to produce a 180° nutation ($\theta = \pi$) of macroscopic moment M, is applied as shown in FIG. 2A, the individual macroscopic moments $m_1$ and $m_2$ will be "flipped" (nutated) by substantially 180°, as shown in FIG. 1F. The phase of moment $m_1$ with respect to $y'$ axis will now be $180° - \phi_1$, of moment $m_2$, $180° + \phi_2$. These moments $m_1$ and $m_2$ will thus continue to travel towards the negative $y'$ axis, i.e., away from the $y'$ axis, as shown in FIG. 1G and after a second period $\tau$, the moments will recluster as shown in FIG. 1H. Thereafter, as shown in FIGURE 1J, the moments $m_1$ and $m_2$ continue fanning out. The reclustering and fanning out give an echo 13, as shown in FIG. 2A, which may be readily detected.

If now, after thermal equilibrium has been reached, the process is repeated except that the interval between the 90° and the 180° pulses is, say, doubled, a second echo 14 will appear as shown in FIG. 2B, but due to the longer interval will be of lesser magnitude. This may be repeated many times with increasing times between the 90° and 180° pulses, and the decay of the successive echoes determined.

In a typical example for proton resonance, $$\gamma = 2.67 \times 10^4$$

and if $H_0 = 500$ gauss and $H_1 = 20$ gauss, the duration of the 90° pulse is $2.74\mu\text{sec.}$, and the 180° impulse $5.48\mu\text{sec.}$, while $\tau$ may equal one millisecond, though this is not critical.

The above explanation assumes that while the field $H_0$ is inhomogeneous, each particle remains stationary during the periods of observation (i.e., no self-diffusion) and that, therefore, each particle remains in a field of constant intensity. If, however, the sample under test exhibits self-diffusion, the particles will be randomly shifting from region to region of different field intensities during the periods between the 90° pulses and the respective echoes. As explained above, this will increase the rate of decay. Thus, where the gradient in field $H_0$ is known, the ratio of amplitudes of impulses 13 and 14 determines the relative rate of self-diffusion.

In order to more accurately compare two impulses affected by molecular self-diffusion, as shown in FIG. 2C after the echo 13 is obtained, a relatively long time $\tau_1 > \tau$ may be permitted to occur, wherein the moments $m_1$ and $m_2$ continue to fan out as shown in FIG. 1J. Then a second 180° pulse 15 is applied as shown in FIG. 2C, again flipping the moments $m_1$ and $m_2$ 180° as shown in FIG. 1K. The subsequent reclustering as shown in FIGS. 1L and 1M gives a second echo 14' as shown in FIG. 2C which may be compared to echo 13 to determine the rate of self-diffusion.

Figure 3:
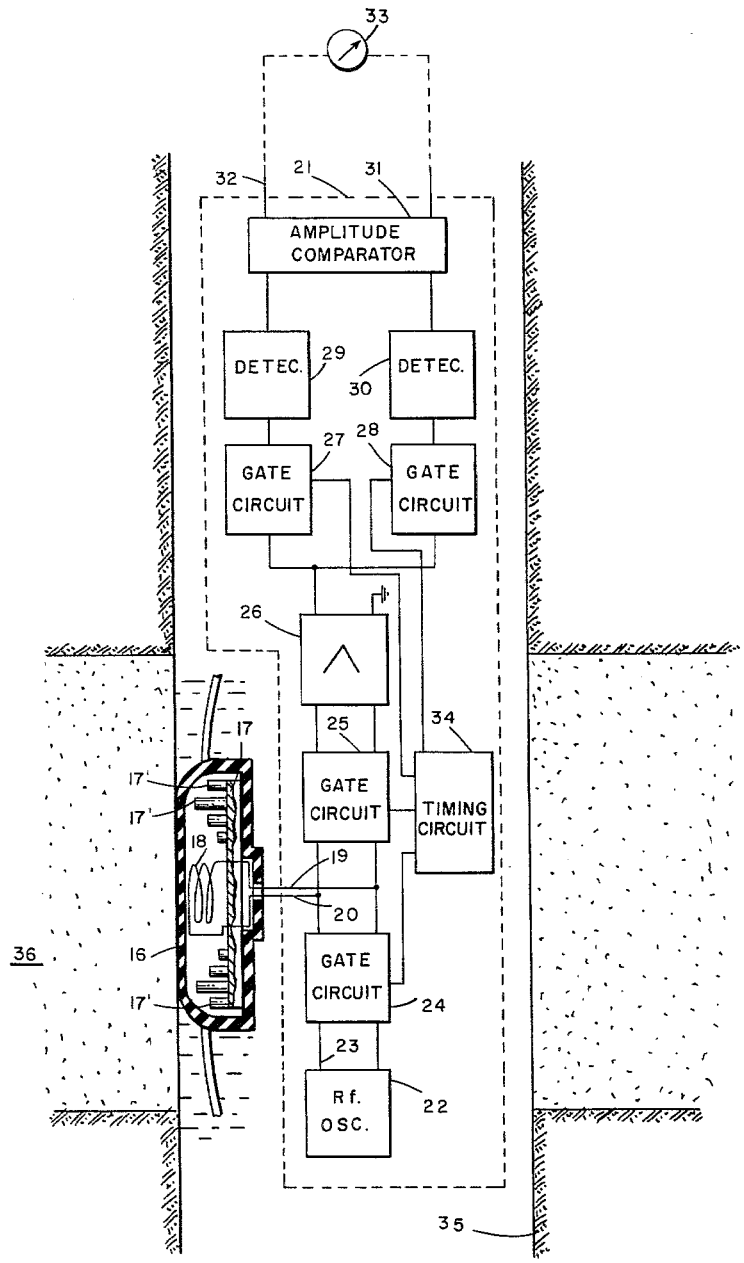
FIG. 3 is a schematic representation of typical well logging apparatus constructed in accordance with the invention.

As shown in FIG. 3, the porous and non-porous formations traversed by a borehole 35 may be located, the relative rates of self-diffusion of the fluid in porous formations determined, all in accordance with the present invention. In FIG. 3 a housing 16 is adapted to be pressed against the wall of a borehole 35 so as to exclude substantially any drilling mud from between the surface of housing 16 and the wall of the borehole. Housing 16 may be pressed against the wall and moved through the borehole in the manner described in copending application Serial No. 330,978, filed January 13, 1953, by N. A. Schuster, for example. Housing 16 is manufactured from nonmagnetic material and is adapted to withstand the pressures and temperatures within the borehole. Interior of housing 16 is a constant magnetic field generating magnet 17 having a plurality of pole faces 17' as described in the aforementioned copending application, and is adapted to generate a constant magnetic field in the earth formations 36 opposite housing 16, parallel to the axis of the borehole. At right angles to this field is a coil 18 within housing 16. Coil 18 is connected by insulated conductors 19 and 20 to the interior of an electronic cartridge 21 which is preferably included in a pressure-resistant housing in the borehole moving with housing 16.

Coil 18 is adapted to be energized at resonant precession frequency of the particles under investigation, in this example protons, in a field having the average intensity of the one generated by magnet 17, by means of R.F. oscillator 22 when the output 23 thereof is gated by gate circuit 24. Conductors 19 and 20 are also connected to the input of gate circuit 25, thence to an amplifier 26 which in turn is connected to parallel gate circuits 27 and 28. The output of gate circuits 27 and 28 is connected to detectors 29 and 30, the outputs of which are applied to an amplitude comparator 31. The output 32 of comparator 31 may be transmitted via conductors in a cable (not shown) to a meter 33 at the surface of the earth. Gate circuits 24, 25, 27 and 28 are controlled by pulses from basic timing circuit 34.

In operation, as housing 16 is moved through the borehole, magnet 17 generates a constant magnetic field $H_0$ in the formations, parallel to the axis of the borehole. As explained in connection with FIG. 1C, gate circuit 24 may be initially opened to permit a 90° pulse to be applied to coil 18 from R.F. oscillator 22. Thereafter gate circuit 24 is closed for a short interval, say 1 millisecond, and thence activated with 180° pulse. During these intervals gate circuit 25 blocks conductors 19 and 20 from the input of amplifier 26. However, immediately before 1 millisecond after the 180° pulse, gate circuit 25 is opened and the echo from the proton resonance in the formation is applied to the input of amplifier 26. At the same time, gate circuit 27 is opened and this echo is detected by detector 29 and fed to amplitude comparator 31.

After a relatively long time interval $\tau_1$, gate circuit 24 is again opened long enough to permit a second 180° pulse to be applied to coil 18. After an interval just shorter than $\tau_1$ following the second 180° pulse, gate circuits 25 and 28 are opened and the second echo detected by detector 30 and fed to comparator 31. The ratio of the amplitudes of these two echoes is then recorded at the surface of the earth by means of meter 33, preferably making a continuous record as a function of the depth of housing 16 in the borehole 35, as is usual in the logging art. After a period long enough for thermal equilibrium to have been reached or when coil 18 has reached a new location, the cycle shown in FIG. 2C and described above may be repeated. Thus meter 33 makes a continuous record of the ratios of the two echo pulses as a function of depth.

Assume that magnet 17 generates a field having a gradient of 10 gauss/cm. in formation 36 and that otherwise the conditions are the same as previously given, $H_0 = 500$ gauss, $H_1 = 20$ gauss. Under borehole conditions, the diffusion constant for water may be of the order of $5 \times 10^{-5}$ cm.$^2$/sec. and for oil $5 \times 10^{-6}$ cm.$^2$/sec. Under these conditions for various times $\tau_1$ the following table gives the ratio of the echoes of water and oil:

| $\tau^1$ | $\left\{\begin{array}{l}\text{Echo I}\\\text{Echo II}\end{array}\right\}$ water | $\left\{\begin{array}{l}\text{Echo I}\\\text{Echo II}\end{array}\right\}$ oil |
| --- | --- | --- |
| $5 \times 10^{-3}$ | 1.36 | 1.06 |
| $10^{-2}$ | 13.4 | 1.36 |
| $3 \times 10^{-2}$ | $10^{11}$ | 14.9 |

Thus by making $\tau_1$ equal to $10^{-2}$ seconds the ratio on meter 33 will show whether formation 36 contains water or oil. Of course, if no signal is obtained, the formation is assumed to be non-porous. Since it is generally desired to locate only oil, $\tau_1$ may be selected equal to $3 \times 10^{-2}$ seconds and only the second echo recorded. In the presence of oil, a noticeable echo will be received while, if no oil is present, no second echo will appear.

It will be understood that the foregoing times and ratios are merely exemplary, and that the constants of self-diffusion will depend on the particular conditions, pressure and temperature, and the molecular structure of the hydrocarbons under investigation. In practice the time $\tau_1$ may be fixed experimentally at the surface from test samples and experience in the same oil field.

In order to improve the signal-to-noise ratio, a plurality of "first" echoes followed by a plurality of "second" echoes may be obtained, as shown in FIG. 2D. After the interval $\tau$ following a 90° pulse 41, a first series of 180° pulses 42 spaced $2\tau$ apart is applied and the amplitude of echoes 43 following each 180° pulse 42 is averaged. The last echo 43' resulting from this first series is followed by a period $\tau_1$ when another 180° pulse 44 is applied and an echo 45 results after another period $\tau_1$. After a period $\tau$ following echo 45 a second series of 180° pulses 46 spaced $2\tau$ is applied and the echoes 45' therebetween averaged. The ratio of the two averages is compared to determine the constant of self-diffusion. The R.F. signal during alternate pulses may be oppositely phased as described in copending Schuster application Serial No. 463,776, filed October 21, 1954, and now Patent No. 2,968,762 granted January 17, 1961.

It will be understood that the foregoing are merely representative embodiments of the invention and that many other apparatuses may be constructed to carry out the principles of the invention. Accordingly, the following claims should not be limited by the representative embodiments described herein.

I claim:

1. Apparatus for logging the earth formations traversed by a borehole comprising: a support adapted to pass through said borehole; means connected to said support for generating a non-homogeneous, substantially constant magnetic field in the earth formation opposite said support; coil means connected to said support and adapted to apply an alternating magnetic field of effective intensity of $H_1$ to said formation substantially at right angles to said constant magnetic field, the frequency of said alternating magnetic field being substantially equal to the resonance precession frequency of particular paramagnetic particles in said constant field; means for activating said coil for a first period of duration substantially equal to $\pi/2\gamma H_1$, where $\gamma$ is the gyromagnetic ratio for said particles, and for a second period of duration substantially equal to $\pi/\gamma H_1$ after an interval $\tau$ following said first period, and for a third period equal to said second period after an interval $\tau_1 + \tau$ following said second period, where $\tau_1 > \tau$; and means for detecting any signal at said frequency in said coil means after an interval $\tau$ following said second period and after an interval $\tau_1$ following said third period; and means for comparing the amplitudes of said detected signals.

2. Apparatus for logging the earth formations traversed by a borehole comprising: a support adapted to pass through said borehole; means connected to said support for generating a non-homogeneous, substantially constant magnetic field in the earth formation opposite said support; coil means connected to said support and adapted to apply an alternating magnetic field of effective intensity $H_1$ to said formation substantially at right angles to said constant magnetic field, the frequency of said alternating magnetic field being substantially equal to the resonance precession frequency of particular paramagnetic particles in said constant field; means for activating said coil for a first period of duration substantially equal to $\pi/2\gamma H_1$, where $\gamma$ is the gyromagnetic ratio for said particles, and for a second period of duration substantially equal to $\pi/\gamma H_1$ after an interval $\tau$ following said first period, and for a plurality of third periods equal to said second period after intervals $2\tau$, and for a fourth period equal to said second period after an interval $\tau_1 + \tau$ following the last of said third periods, where $\tau_1 > \tau$, and for a plurality of fifth periods equal to said second period after intervals $2\tau$; means for detecting the resonance signals in said coil means following said second, third, fourth and fifth periods; and means for comparing the resonance signals detected following said second and third periods with the resonance signals detected following said fourth and fifth periods.

3. Apparatus for logging the earth formations traversed by a borehole comprising: a support adapted to pass through said borehole; means connected to said support for generating a non-homogeneous, substantially constant unidirectional magnetic field in the earth formations opposite said support; coil means carried by said support and adapted to apply an alternating magnetic field to said formation substantially at right angles to said constant magnetic field, the frequency of said alternating magnetic field being substantially equal to the resonance precession frequency of particular paramagnetic particles in said constant field; means for periodically activating said coil means; means for detecting any signal at said frequency in said coil means in the intervals when said coil means is not activated; and means coupled with said detecting means for comparing the amplitudes of the detected signals at different times intermediate such periodic activation of said coil means to derive a continuous indication as a function of depth of the relative amplitudes of the detected signals.

4. Apparatus for logging the earth formations traversed by a borehole comprising: a support adapted to pass through said borehole; means carried by said support for generating a non-homogeneous steady unidirectional magnetic field in the earth formations opposite said support; coil means carried by said support and adapted to apply an alternating magnetic field to said formations substantially at right angles to said constant magnetic field, the frequency of said alternating magnetic field being substantially equal to the resonance precession frequency of particular paramagnetic particles in said unidirectional magnetic field; means for periodically activating said coil means with alternating current at said frequency; means for detecting any signal at said frequency in said coil means in the intervals when said coil means is not activated; and means responsive to the ratio of detected signals induced at different times during said intervals for comparing the amplitudes of the detected signals and providing indications of such comparison as a function of depth in said borehole.

5. Apparatus for logging the earth formations traversed by a borehole comprising: a support adapted to pass through said borehole; means carried by said support for generating a non-homogeneous, steady unidirectional magnetic field of predetermined intensity in the earth formations opposite said support; coil means carried by said support and adapted to apply an alternating magnetic field to said formations substantially at right angles to said constant magnetic field, the frequency of said alternating magnetic field being substantially equal to the resonance precession frequency of particular paramagnetic particles in said unidirectional magnetic field; means for periodically activating said coil means with alternating current at said frequency; means for detecting a signal at said frequency in said coil means in the intervals when said coil means is not activated; and means for comparing the amplitudes of the detected signals to derive indications characterizing the fluid content of said formations.

6. Apparatus for logging the earth formations traversed by a borehole comprising: a support adapted to pass through said borehole; means carried by said support for generating a non-homogeneous, unidirectional magnetic field of predetermined intensity in the earth formations opposite said support; coil means carried by said support and adapted to apply an alternating magnetic field to said formations substantially at right angles to said constant magnetic field, the frequency of said alternating magnetic field being substantially equal to the resonance precession frequency of particular paramagnetic particles in said unidirectional magnetic field; means for periodically activating said coil means with alternating current at said frequency at predetermined time intervals to produce spin echos; means for detecting any echo signal at said frequency in said coil means in the intervals when said coil means is not activated; and means for comparing the amplitudes of detected echo signals in successive intervals to derive continuous indications characterizing the fluid content of said formations as a function of depth.

7. A method of logging the earth formations traversed by a well bore to derive information concerning their fluid content, comprising the steps of establishing a slightly non-homogeneous unidirectional magnetic field of predetermined average intensity extending through a region within earth formations at successive levels in the well bore to orient macroscopic magnetic moments associated with hydrogen nuclei in such regions with respect to said unidirectional field, periodically subjecting said hydrogen nuclei to a succession of relatively intense pulses of an R.F. alternating magnetic field at an angle to said directional magnetic field and at a frequency substantially equal to the resonance precession frequency of said hydrogen nuclei in said unidirectional field in recurrent time intervals each sufficiently long for observable decay of the magnetic resonance to occur, said pulses having an amplitude and time spacing in each succession to induce a relatively prompt and a relatively delayed spin echo signal, and during such intervals detecting the comparative intensity of the resulting prompt and delayed spin echo signals to obtain an indication at each such level characterizing the viscous properties of formation fluid containing said hydrogen nuclei and the porosity of the corresponding formations.

References Cited by the Examiner
UNITED STATES PATENTS

| | | |
|---|---|---|
| 2,139,460 | 12/1938 | Potapenko. |
| 2,535,666 | 12/1950 | Broding. |
| 2,705,790 | 4/1955 | Hahn _____ 324—0.5 |
| 2,968,761 | 1/1961 | Zimmerman et al. ____ 324—0.5 |

OTHER REFERENCES

Bloembergen et al.: Physical Review, vol. 73, No. 7, Apr. 1, 1948, pp. 679 to 712 incl.

Carr et al.: Physical Review, vol. 94, No. 3, May 1, 1954, pp. 630 to 638.

Frish: Book entitled "Progress in Nuclear Physics," vol. 6, published by Pergamon Press, New York, 1957, pp. 26–49.

Hahn: Physical Review, vol. 77, No. 2, Jan. 15, 1950, pp. 297 and 298.

Hahn: Physics Today, November 1953, pp. 4–9.

Hahn: Spin Echoes, published in Physical Review, vol. 80, No. 4, November 15, 1950, pp. 580–594.

Malling: Electronics, June 1954, pp. 134–137.

CHESTER L. JUSTUS, *Primary Examiner.*

KATHLEEN H. CLAFFY, FREDERICK M. STRADER, NORMAN H. EVANS, *Examiners.*